US008914551B2

(12) United States Patent
Mortensen et al.

(10) Patent No.: US 8,914,551 B2
(45) Date of Patent: Dec. 16, 2014

(54) SENSOR POLLING UNIT FOR MICROPROCESSOR INTEGRATION

(71) Applicant: Analog Devices A/S, Allerød (DK)

(72) Inventors: Mikael M. Mortensen, Kgs. Lyngby (DK); Isaac Novet, Ramona, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 13/859,473

(22) Filed: Apr. 9, 2013

(65) Prior Publication Data

US 2014/0304436 A1    Oct. 9, 2014

(51) Int. Cl.
*G06F 3/00* (2006.01)
*G06F 13/10* (2006.01)

(52) U.S. Cl.
CPC .................................... *G06F 13/10* (2013.01)
USPC .............................................. 710/8; 710/62

(58) Field of Classification Search
None
See application file for complete search history.

(56) References Cited

U.S. PATENT DOCUMENTS

| | | | |
|---|---|---|---|
| 4,593,362 | A | 6/1986 | Bergeron et al. |
| 4,598,363 | A | 7/1986 | Clark et al. |
| 6,924,746 | B2 | 8/2005 | Hermary |
| 7,470,060 | B1 | 12/2008 | Hoben et al. |
| 8,024,499 | B1 | 9/2011 | Aybay et al. |
| 8,279,080 | B2 | 10/2012 | Pitchford et al. |
| 8,706,172 | B2 | 4/2014 | Priyantha et al. |

FOREIGN PATENT DOCUMENTS

EP    0205274    12/1986

OTHER PUBLICATIONS

Junwei Zhou et al., "Communication Buses and Protocols for Sensor Networks," Sensors 2002, 2, 244-257, ISSN 1424-8220 © 2000 by MDPI, http://www.mdi.net/sensors, 14 pages.
Qing Cao et al., "Energy-Optimal Batching Periods for Asynchronous Multistage Data Processing on Sensor Nodes: Foundations and an mPlatform Case Study," Proceedings, Proc. of IEEE Real Time Technology and Applications Symposium (RTAS2010), IEEE Computer Society © 2010, 11 pages.
Jason Tanner et al., "Inside the iPhone 5s," Chipworks, Sep. 20, 2013, www.chipworks.com/en/technical-competitive-analysis/resources/blog/inside-the-iphone-5s/, 6 pages.
Bodhi Priyantha et al., "LittleRock: Enabling Energy Efficient Continuous Sensing on Mobile Phones," Microsoft Research, Feb. 18, 2010, TechReport, MSR-TR-2010-14, http://research.microsoft.com/apps/pubs/default.aspx?120316, 13 pages.

(Continued)

*Primary Examiner* — Cheng-Yuan Tseng
(74) *Attorney, Agent, or Firm* — Patent Capital Group

(57) ABSTRACT

A sensor polling unit for microprocessor integration comprises a configuration logic block associated with each of a plurality of external sensor devices. Each configuration logic block issues a read command for predetermined sensor data registers of the associated external sensor device via a read trigger supplied by a trigger generator. A global timer based on a microprocessor clock signal supplies a global time value to the trigger generators. A polling state machine is operatively coupled to the configuration logic blocks for receipt of respective read commands, and issues a corresponding read command to the external sensor device through a standardized bi-directional data communication interface connected to the external sensor device. The polling state machine receives register data transmitted by the external sensor device in response to the read command and transmits the received register data to a microprocessor accessible data memory area for storage.

28 Claims, 3 Drawing Sheets

(56) References Cited

OTHER PUBLICATIONS

Sergejs Cuhrajs, "Lower the Power Consumption in Xperia Devices with the New Sensor Co-Processor [Video + Code Example]," Mar. 24, 2014, http://developer.sonymobile.com/2014/03/24/lower-your-experias-power . . . , 4 pages.

"LPC microcontrollers, Discover the Difference," NXP, © 2014 NXP Semiconductors N.V., Feb. 2014, 939775017523, Published in the USA, 15 pages.

"SEN," SENtral Motion Coprocessor, PNI Sensor Corporation, http://www.pnicorp.com/products/sentral, Retrieved Aug. 21, 2014, 3 pages.

SENSOR POLLING UNIT FOR MICROPROCESSOR INTEGRATION

The present invention relates to a sensor polling unit for microprocessor integration. The sensor polling unit comprises a sensor register model comprises a configuration logic block associated with each sensor device of a plurality of external sensor devices. Each configuration logic block is configured to issue a read command for one or more predetermined sensor data registers of the associated external sensor device in accordance with a read trigger supplied by a trigger generator of the configuration logic block. A global timer based on a clock signal of the microprocessor supplies a global time value to the trigger generators. A polling state machine is operatively coupled to the plurality of configuration logic blocks for receipt of respective read commands therefrom, said polling state machine being configured to issue a corresponding read command to the external sensor device through a standardized bi-directional data communication interface connected to the external sensor device. The polling state machine is further configured to receive register data transmitted by the external sensor device in response to the read command and transmit the received register data to a microprocessor accessible data memory area for storage.

BACKGROUND OF THE INVENTION

The present invention relates to a sensor polling unit for microprocessor integration. The sensor polling unit is configured to address and read the respective data contents of respective data registers of a plurality of external sensor devices. The sensor polling unit has several useful properties in a microprocessor, inter alia off-loading a microprocessor or DSP core of the microprocessor from the details of reading, extracting and otherwise handling the respective register data delivered by the plurality of external sensor devices. The microprocessor and plurality of external sensor devices may be mounted in a piece of portable communication equipment such as tablet, smartphone, mobile phone etc. These external sensor devices may for example comprise digital microphones, multi-axis accelerometers, gyroscopes, GPS units etc. acquiring different types of real time register data associated with the sensor device that must be manipulated or processed by the microprocessor to provide various kinds of functionality in the piece of portable communication equipment. Existing microprocessors are often adapted to handle the associated external sensor devices by manually polling each of the sensors for new register data by software routines triggered by appropriately configured timers of the microprocessor. After the register data have been read into the microprocessor through a suitable data communication interface, the register data must be written to a suitable data memory area or location. In the alternative, existing microprocessors may include a Direct Memory Access (DMA) controller adapted to poll the external sensor devices and read the register data in bursts at time intervals set by the timer or timers.

Unfortunately, these prior art methods of reading and storing the register data delivered by the external sensor devices do not fit how sensors acquire and store their sensor data in internal sensor registers very well. A DMA controller is optimized for burst reading of large consecutively arranged data amounts or chunks from memory devices such as external EEPROM or flash memory. Sensor registers on the other hand, may be relatively few in number, vary in size and have non-consecutive addresses. A microprocessor is generally not well-suited for reading sensor data from multiple sensor devices because this type of data reading requires not only frequent interrupt handling, but also manual detection of which of the multiple sensor devices that actually generated particular set of incoming sensor data. This problem is growing because contemporary and future sensor devices can be expected to require higher sampling rates driven by associated benefits in latency (delay) reduction in the implemented function. In addition, a growing number of sensor devices can be expected to be integrated in future electronic equipment to provide new sensor based features and functions or simply to improve the perceived quality of existing sensor based features and functions.

U.S. Pat. No. 8,024,499 B1 discloses a system control module comprising a system control processor connected to a sensor polling logic/unit for automated polling of sensor data from multiple sensors. The sensors are mounted on separate target or circuit boards which may be line cards, Ethernet cards, ATM cards etc. The sensors include voltage sensors and temperature sensors. The sensor polling logic/unit comprises a transaction table which includes an address for each sensor and other associated fields of information such as a polling rate for each sensor.

U.S. Pat. No. 4,593,362 discloses an apparatus for polling asynchronous sensors of a distributed computer system to optimize the data load offered by the sensors to a central processor. The polling apparatus operates in accordance with time delay status recorded in the sensor buffer stores of the memory unit of the central processor. The system determines the amount of data received in a sensor buffer store during the polling sequence and dynamically varies the value of the time delay status to optimize the load of sensor data imparted upon the central processor. The type of the data collected and delivered by the sensors from their associated telephone switching units remains unspecified.

U.S. Pat. No. 6,924,746 B2 discloses a sensor polling unit operating in an industrial automation equipment environment between a host computer and multiple optical range sensors. The sensor generated data are related to respective positions and dimensions of manufactured pieces of goods throughout the manufacturing site.

SUMMARY OF INVENTION

A first aspect of the invention relates to a sensor polling unit for microprocessor integration, comprising:

a sensor register model comprising a configuration logic block associated with each sensor device of a plurality of external sensor devices, each configuration logic block being configured to issue a read command for one or more predetermined sensor data registers of the associated external sensor device in accordance with a read trigger supplied by a trigger generator of the configuration logic block. A global timer based on a clock signal of the microprocessor supplies a global time value to the trigger generators. A polling state machine is operatively coupled to the plurality of configuration logic blocks for receipt of respective read commands therefrom and further configured to issue a corresponding read command to the external sensor device through a standardized bi-directional data communication interface connected to the external sensor device. The polling state machine is further configured to receive register data transmitted by the external sensor device in response to the read command and transmit the received register data to a microprocessor accessible data memory area for storage.

The sensor polling unit preferably comprises a digital state machine with appropriately configured combinatorial digital logic and sequential digital logic such as registers, multiplexers, digital counters, digital comparators, data busses, clock networks etc. The sensor pooling may therefore be implemented as a dedicated assembly of digital logic hardware capable of off-loading the microprocessor or microprocessor core from actually having to control details of the interrogation of the sensor devices and the subsequent read out of the respective register data generated by the plurality of external sensor devices. These tasks are instead handled by the sensor polling unit allowing the microprocessor to await that a certain amount of register data has been accumulated by the sensor polling unit and written to the microprocessor accessible data memory area or address space. Once, the desired amount of register data has been accumulated the microprocessor core may apply pre-programmed data manipulating or processing operations to the accumulated amount of register data.

The microprocessor accessible data memory area may comprise data memory which is integrated with the microprocessor on a common a semiconductor die (on-chip data memory) and connected to a core of the microprocessor via a suitable internal, i.e. on-chip, data memory bus. The microprocessor accessible data memory area may alternatively reside on an external dedicated memory chip. Finally, the microprocessor accessible data memory area may comprise a combination of both of these types of data memory, i.e. on-chip and off-chip data memory areas. The data memory may for example RAM, EEPROM and flash memory or any combination of these memory types.

The standardized bi-directional data communication interface associated with, or available to, the SPU and connected to the plurality of external sensor devices preferably comprises one or more industry standard serial synchronous data interface(s) such as $I^2C$, SPI, SDIO or SLIMBus etc. These data interfaces are already widely available on existing sensor devices. The skilled person will appreciate that the SENSOR POLLING UNIT in some embodiments of the invention may be configured to handle several types of standardized bi-directional data communication interfaces for example an $I^2C$ serial data interface and a SPI serial data interface. These differing types of standardized bi-directional data communication interfaces may be connected to different external sensor devices such that a first and second external sensor devices may be coupled to common $I^2C$ serial data interface and a third, and possibly further, senor devices may be coupled to another type of serial data interface such as SPI.

The sensor polling unit is preferably configured to transmit the received register data directly to the microprocessor accessible data memory area, i.e. without passing through the microprocessor core. This feature reduces markedly the computational load on the microprocessor core and saves power because the register data circumvent the often power consuming data registers and data busses of the microprocessor core. In a preferred embodiment, the sensor polling unit comprises a data receive interface block, for example embodied as a DMA interface, which functions as an interface between the polling state machine of the sensor polling unit and the microprocessor accessible data memory area. Since the interface to the relevant data memory area may be rather complex for example involving transmission through a DMA controller and its associated DMA channels, the interface is preferably handled by a dedicated piece of digital logic hardware implementing the data receive interface as described below in additional detail in connection with the appended drawings.

The skilled person will appreciate that the highly diverse nature of the external sensor devices including differences of data register architectures, polling modes etc. would represent a significant computational challenge to the microprocessor core and thus consume considerable computational resources. Furthermore, many types of external sensor devices require substantially constant time intervals for sensor register reading. This fact represents a significant programming challenge for the typical complex collection of software/application programs running on the microprocessor core. Consistent real-time handling of the external sensor devices is difficult to guarantee in such software driven computing environment. Hence, the present sensor polling unit will lead to substantial reduction of the computing resources required by the microprocessor core and improve the accuracy of the read-out of the respective register data of the external sensor devices.

The plurality of external sensor devices preferably comprises one or more sensors selected from a group of {gyroscopic, accelerometer, position sensor, temperature sensor, audio sensor, magnetic field sensor etc.}. The external sensor devices may accordingly comprise a variety of sensor types adapted to measure certain physical properties of a particular piece of portable equipment such as a smartphone. Each of the external sensor devices preferably comprises a standardized bi-directional data communication interface or port that is compatible with at least one of the standardized bi-directional data communication interface or interfaces associated with the sensor polling unit to allow seamless interconnection and exchange of register data content with each of the external sensor devices.

The register data supplied from the sensor data register of each of the external sensor devices are preferably digitally encoded in a suitable format before transmission through the standardized bi-directional data communication interface of the sensor device. Some of the external sensor devices may include an A/D converter for converting an analog signal delivered by a sensor element into a corresponding sampled and digitally coded signal which is written to the sensor registers as digitally coded register data.

The trigger generator of one or more of the configuration logic blocks preferably comprises a block timer, driven by the global time value, to generate the read triggers for the associated sensor device at well-defined time intervals. These time intervals may be substantially constant or may vary depending on the data read-out requirements of a particular sensor device. In some embodiments, the time intervals may vary in dependence of an operational state of the microprocessor integrated together with the sensor polling unit as discussed below in additional detail in connection with system integration aspects of the sensor polling unit. The block timer may comprise a binary modulo N counter having a counter output from which the read time intervals are derived. In one such embodiment, the counter output of the modulo N counter is coupled to a first input of a digital comparator. A read-interval register of the block timer holds a pre-set read value coupled to a second input of the digital comparator such that the latter is configured to generate the read trigger when a value of the counter output matches the pre-set read value. The repetitive nature of the modulo N counter in combination with the clock signal ensure read triggers are provided at substantially constant time intervals for a given clock frequency.

Some types of sensor devices may comprise only a single sensor data register while other types of sensors may comprise a plurality of sensor data registers holding respective register data. To support sensor types with multiple sensor data registers at least one of the configuration logic blocks preferably comprises a plurality of register addresses of the plurality of predetermined sensor data registers of the associated external sensor device. The skilled person will appreciate that the register addresses of the plurality of predetermined sensor data registers may either be consecutive or non-consecutive such that the plurality of register addresses of the at least one configuration logic block in one embodiment are consecutive reflecting the consecutive arrangement of the plurality of sensor data registers of the associated external sensor device. In this embodiment, the polling state machine is preferably configured for issuing a burst read command to the external sensor device to read respective register values or data of the plurality of consecutive sensor data registers during a single read operation. The burst reading of the respective register values or data of the plurality of consecutive sensor data registers saves power by reducing switching activity on the standardized bi-directional data communication interfaces of the sensor device and the sensor polling unit.

In an alternative embodiment, the plurality of register addresses of the at least one configuration logic block are non-consecutive reflecting a non-consecutive arrangement of the plurality of predetermined sensor data registers of the associated external sensor device.

A configuration logic block may in some embodiments comprise individual register size indicators for the one or more predetermined sensor data registers. This feature is particularly useful for correct read out of the register data of mixed size registers of an external sensor device.

Configuration data specifying to the above-mentioned characteristics of the each of the external sensor devices (e.g. register addresses, register architecture, desired polling mode and read/polling time intervals) may be written by the microprocessor core to the relevant registers of each of the configuration logic blocks in connection with an initialization procedure executed by the microprocessor during microprocessor system power-on or boot. Alternatively, the configuration data may be written by the microprocessor core in connection with an initialization routine for an associated application or software routine.

In a particularly advantageous embodiment of the present sensor polling unit, the trigger generator of one or more of the configuration logic blocks comprises an interrupt input operatively coupled to an interrupt terminal of the microprocessor for receipt of an interrupt signal of the associated external sensor device. The trigger generator is configured to generate the read trigger in response to the interrupt signal. The interrupt signal supplied to the trigger generator of the configuration logic block is thereby adapted to function as a trigger for the issuance of the read signal such that the configuration logic block may operate fully or partially in an interrupt based polling mode with respect to the associated external sensor device. In one embodiment, the trigger generator may be programmed to ignore the global time value and solely be responsive to the interrupt signal such that the configuration logic block operates fully in the interrupt based polling mode. This is preferably achieved by adding a mode selector to the trigger generator to selectively couple the interrupt signal or the block timer through the trigger generator as the read signal. By appropriate programming of the mode selector, the configuration logic block may be adapted to operate in either a time based polling mode or an interrupt based polling mode with respect to the associated external sensor device. The skilled person will understand that operation in a hybrid mode with a combination of the time based polling mode and interrupt based polling mode is an alternative option.

The skilled person will appreciate that the interrupt driven polling mode capability of the sensor polling unit is highly advantageous for the handling of low-power sensors by reducing power consumption of the associated microprocessor. The advantage is caused by a markedly reduced power consumption of the sensor polling unit when polling the external sensor device for register data read-out only upon request of the sensor device itself via the interrupt request. Hence, sensor devices that generate new sensor data at unpredictable times or just infrequently are only polled by the sensor polling unit when there is a need to read new sensor data. This feature minimizes digital switching activity in the sensor polling unit and reduces data transmission/receipt switching activity on the standardized bi-directional data communication interface in question together with its associated board wiring etc.

The polling state machine is preferably configured for interrupting the microprocessor in response to receipt and storage of a predetermined amount of register data in the microprocessor accessible data memory area. This feature may reduce the power consumption of the microprocessor because it allows the latter to reside in a sleep-mode or inactive mode until receipt of the interrupt signal from the polling state machine. Alternatively, the microprocessor is relived from the computational burden imparted by the handling of the sensor devices and may fully devote computational resources to execute other application programs in parallel with the collection of the register data by the sensor polling unit until receipt of the interrupt signal.

The microprocessor may comprise a general purpose DMA controller configured to write certain types of system data and other data directly to designated portions of the data memory via the data bus without intervention from microprocessor. In this case, the sensor polling unit may comprise a DMA interface operatively coupled to the polling state machine for receipt of register data therefrom. The DMA interface being operatively coupled to a DMA controller of the microprocessor for transmission of the register data to the microprocessor accessible data memory area via the DMA controller.

Ordinary DMA controllers are primarily configured for efficient transfer of data in bursts while the sensor data transmitted by the polling state machine through the DMA interface tend to be scattered in time unless corrective action is taken. This time scattering of received register data may be caused by the execution of several separate read-out operations from the registers of the external sensor device through the data communication interface. For this reason it is beneficial to collect a certain amount of register data in the polling state machine before invoking the DMA interface and DMA controller. In one such embodiment, the polling state machine comprises a register area for intermediate collection and storage of a predetermined amount of the register data before transmission through the DMA interface to the DMA controller. The polling state machine therefore collects these time scattered register data and assembles these in the register area in a structured fashion. The register area may comprise a FIFO buffer per external sensor device. This embodiment of the polling state machine allows efficient use of the resources of an existing DMA controller of the microprocessor.

In alternative embodiments of the sensor polling unit, the microprocessor lacks the a above-discussed DMA controller and the sensor polling unit may be directly connected to the microprocessor accessible data memory area via a suitable data interface. In the latter embodiment, the sensor polling unit is accordingly configured to directly write the received register data to a specified address space of the microprocessor accessible data memory data area.

A second aspect of the invention relates to an integrated semiconductor die or chip comprising a microprocessor and a sensor polling unit according to any of the above described embodiments of these devices.

A third aspect of the invention relates microprocessor system comprising an integrated semiconductor die as mentioned above operatively coupled to a plurality of external sensor devices via respective standardized data communication interfaces. The plurality of external sensor devices may share a single type of standardized data communication interface or be coupled to different types of standardized data communication interfaces.

The plurality of external sensor devices may comprise one or more sensors selected from the previously discussed sensor device group of {gyroscopic, accelerometer, position sensor, temperature sensor, audio sensor, magnetic field sensor etc.}.

The microprocessor system comprising a microprocessor with the present sensor polling unit may include multiple power modes, e.g. sleep mode, a surveillance mode and a normal operation mode, controlled by a suitable power mode control application executed by the microprocessor. The sleep-mode may for example include a disablement of certain portions of the clock network and/or a reduction of the clock frequency of a master clock signal of the microprocessor. In a preferred embodiment of such a microprocessor system, the microprocessor is configured to execute the power mode control application and thereby select between multiple power modes of the microprocessor system. The power mode control application comprises a set of executable program instructions configured to control a setting of at least one configuration logic block in accordance with the power mode of the microprocessor system. This embodiment may be utilized to provide numerous useful enhancements to the functionality of one or more of the configuration logic blocks for example to disable read triggers of a trigger generator or change a time period between consecutive read triggers dependent on the selected power mode. Hence, the polling of a particular external sensor device that is unused in a particular power mode may be interrupted. Alternatively, the read time interval, i.e. polling rate, of the external sensor device may prolonged instead of interrupted which also will reduce power consumption of the sensor polling unit and data communication interface.

BRIEF DESCRIPTION OF THE DRAWINGS

Preferred embodiments of the invention will be described in more detail in connection with the append drawings in which.

DESCRIPTION OF PREFERRED EMBODIMENTS

Figure 1:
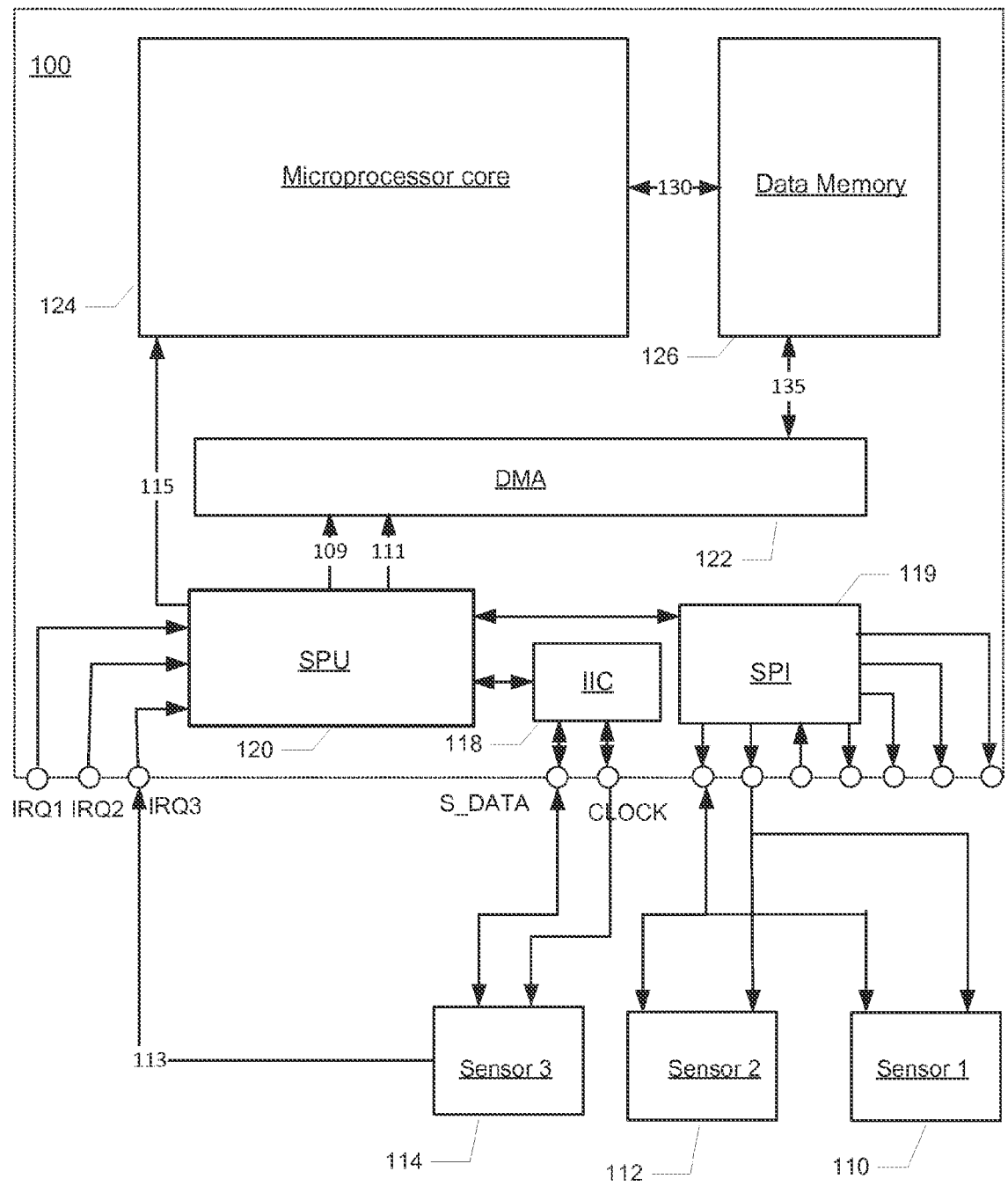
FIG. 1 is a schematic block diagram of a microprocessor comprising a sensor polling unit in accordance with a first embodiment of the present invention connected to a plurality of external sensor devices.

FIG. 1 is a schematic drawing of a microprocessor 100 coupled to three external sensor devices 110, 112 and 114 through standardized serial bi-directional data communication interfaces. The standardized serial bi-directional data communication interfaces or serial data interfaces comprise an $I^2C$ serial data interface having a serial data line and a clock line coupled from an $I^2C$ communication port 118 of the microprocessor 100 through externally accessible external terminals or pads S_DATA and CLOCK to the first external sensor device 110. The second and third external sensor devices 112, 114, respectively, are coupled to the microprocessor via a SPI serial data interface. The SPI serial data interface comprises a second communication port 119 of the microprocessor 100. The skilled person will understand that other types of standardized serial or parallel data communication interfaces may be utilized in other embodiments of the invention such as SLIMbus etc. Furthermore, the microprocessor 100 may in the alternative comprise only one type of serial data interface that is shared between all of the external sensor devices. The external sensor devices may comprise a variety of different sensor types such as gyroscopic sensors, accelerometer sensor, position sensors, temperature sensors, voltage and current sensors, audio sensors, magnetic field sensor etc. Hence, the total number of interconnected external sensor devices may exceed the schematically illustrated collection of three sensor devices. Each of the external sensor devices may deliver binary encoded register data representing the particular physical property/properties the sensor is configured to measure. In some embodiments, one of the external sensor devices may comprise a 3-axis accelerometer or a GPS device. In the present embodiment, the respective sensor data of the sensors 110 and 112 are read at regular time intervals, i.e. at a constant sampling rate, by the SPU 120 through the SPI data interface while sensor data generated by Sensor 3 (114) is generally read at irregular time intervals only in response to an interrupt request generated by an embedded controller of Sensor 3. The interrupt request from Sensor 3 is conveyed to a trigger generator of the SPU 120 through interrupt wire 113 and externally accessible microprocessor terminal IRQ3. These alternative mechanisms for reading sensor data are explained in further detail below.

The microprocessor 100 may be fabricated on a single semiconductor die fabricated in suitable digital semiconductor processes such as 0.35 µm, 0.18 µm or 0.065 µm CMOS. The skilled person will appreciate that the microprocessor 100 and the three of external sensor devices 110, 112 and 114 may be integrated with a portable terminal such as a smartphone, tablet or mobile phone for supporting various sensor derived functions and features of the portable terminal such as real-time or streaming of audio and video content, user interface functions such as position, orientation, acceleration information etc.

Each of the sensors 110, 112 and 114 comprises one or more sensor data registers(s) holding measured/acquired sensor data values such as temperatures, acceleration in a one or more predetermined direction(s) or plane(s), one or more digital audio sample(s) etc. The sensor data registers may comprise volatile memory, such as data registers or RAM, or non-volatile memory, such as flash memory or EEPROM, integrated on a sensor chip interfacing to a transducing element or device of the external sensor device. If the sensor comprises a plurality of the sensor data registers, these may be consecutive or non-consecutive arranged in the memory of sensor. Furthermore, the individual sizes of the data registers of particular sensor device may vary such that some data registers possesses an 8-bits size while other registers may have sizes anywhere between 16 and 32 bits. These differences in sensor register structure or layout must be appropriately addressed by the sensor polling unit 120 in order to ensure correct reading of the contents of all sensor registers.

The present sensor polling unit 120 solves this challenge through a sensor register model as described in further detail below.

The microprocessor 100 comprises a microprocessor core 124 and a data memory 126. The microprocessor core 124 may comprise a standard ARM Cortex-M4 processor core available from ARM Holdings or any other proprietary or standard microprocessor or DSP core. The data memory 126 is connected to the microprocessor core 124 via a data memory bus 130. The data memory 126 may be integrated with the microprocessor 100 on a common a semiconductor die as indicated on the figure or arranged on a dedicated memory chip or implemented as a combination of both, i.e. both on-chip and external (off-ship) data memory. The microprocessor 100 furthermore comprises a Direct Memory Access (DMA) controller 122 that is configured to take certain chunks or portions of data supplied by the sensor polling unit (SPU) 120 through DMA channels 109, 111 and write these data directly to a specified address space of the data memory 126 without involvement of the microprocessor core 124 as described below in additional detail. The sensor polling unit 120 of the microprocessor 100 is accordingly operatively coupled between the serial communication ports 118, 119 and the DMA controller 122 in the present embodiment of the invention. However, in alternative embodiments of the microprocessor 100, which may lack the DMA controller 122, the SPU 120 may be directly connected to the data memory 126. Thus, being configured to directly write the register data to the specified address space of the data memory 126. The SPU 120 comprises a polling state machine (not shown) that is configured for interrupting the microprocessor core 124 via interrupt signal or wire 115 in response to receipt and storage of a predetermined amount of register data in the designated data memory location of the data memory 126 as explained in further detail below.

The skilled person will appreciate that the SPU 120 is capable of off-loading the microprocessor core 124 from actually having to control the details of the interrogation and read out of the respective sensor data generated by the three external sensor devices 110, 112 and 114. This task is instead handled by the SPU 120 such that the microprocessor core 124 may simply await a certain amount of the sensor data has been collected by the SPU 120 and written to the memory space of the data memory addresses as described above before initiating the appropriate data manipulating or processing operations. The skilled person will appreciate that the highly diverse nature of the external sensor devices, differences of data register architectures, polling modes etc. would represent a significant computational challenge to the microprocessor core.

Figure 2:
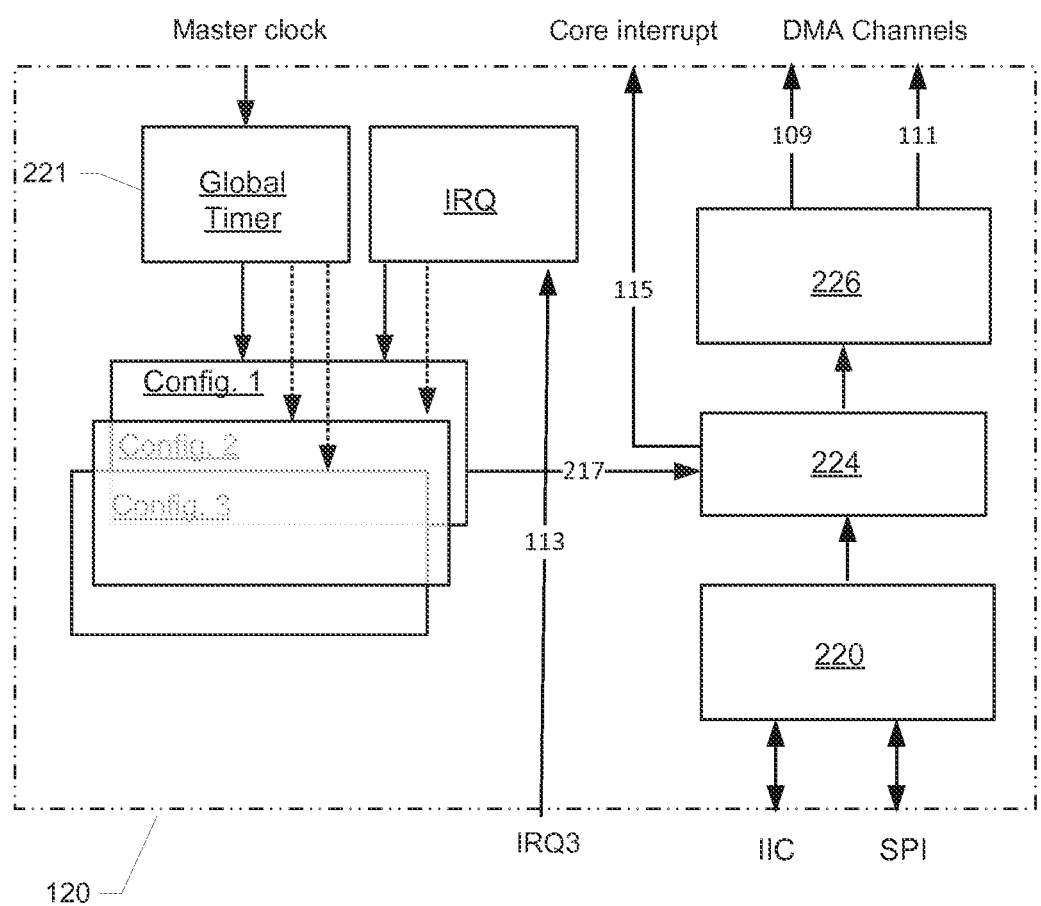
FIG. 2 is a schematic block diagram of the sensor polling unit comprising a plurality of configuration logic blocks associated with respective external sensor devices.

FIG. 2 is a schematic block diagram of the sensor polling unit 120 integrated on the microprocessor 100 and comprising a plurality of configuration logic blocks, Config. 1-3, associated with respective ones of the external sensor devices 110, 112 and 114. Each of the configuration logic blocks of the sensor polling unit 120 are configured to issue a read command or signal 217 for one or more predetermined sensor data registers of the associated external sensor device in accordance with a read trigger supplied by a trigger generator (refer to item 313 of FIG. 3) of each configuration logic block. The sensor polling unit 120 comprises a global timer 221 which is driven by a master clock signal, Master Clock, of the microprocessor 100. The skilled person will understand that various other clock signals may be used as input to the global timer 221 depending on signal availability and/or a desired frequency of the clock signal etc. The global timer 221 comprises a binary modulo N counter in the present embodiment where N may be an integer between 1 and $2^{32}$ depending on the desired repetition time period and desired time resolution of the binary counter. The desired repetition time period may conveniently be determined by the sensor device with the longest polling time interval. The time resolution may advantageously be determined by the sensor device with the shortest polling time interval. The global timer 221 limits the resolution of the trigger generators (item 313 of FIG. 3) as the sample interval of any given sensor will be $2^N$ times the time resolution, where N may be an integer value between 1 and $2^{32}$ in the present embodiment.

Figure 3:
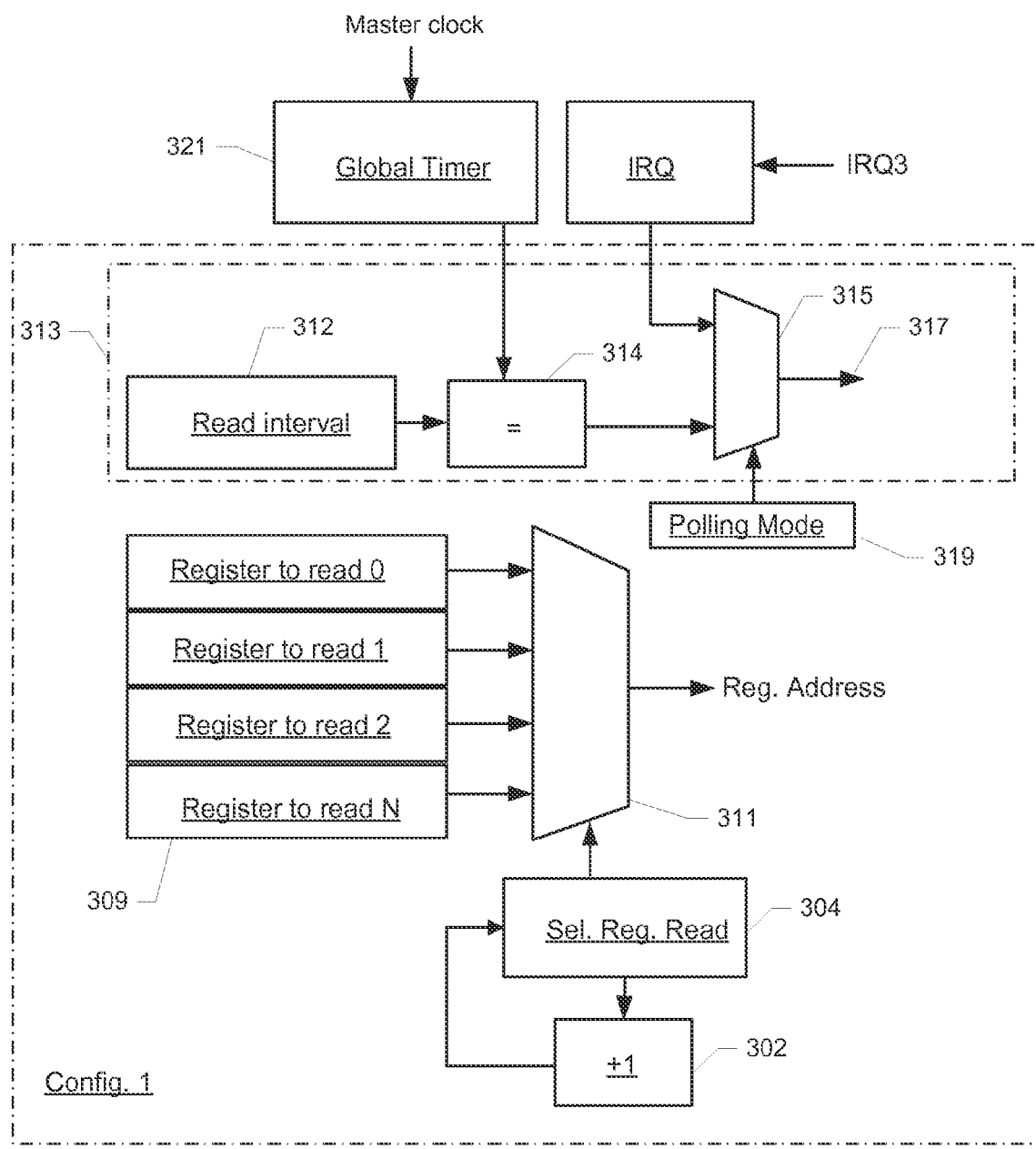
FIG. 3 is a schematic block diagram of a configuration logic block of the sensor polling unit associated with an external sensor device in accordance with a preferred embodiment of the present invention.

In alternative embodiments the global timer may be replaced by local timers integrated together with each of the trigger generators (item 313 of FIG. 3). This alternative embodiment of the global timer will likely result in more precise time resolution for each sensor device, but at the penalty of larger semiconductor die area and increased power consumption.

The role of the global timer is to supply a global time reference or value to each of the trigger generators held in the configuration logic blocks allowing the latter to determine the desired read interval of the associated external sensor device in an accurate and consistent manner. Depending on the nature of the particular sensor device, its desired reading interval or sampling rate may vary considerably. The reading interval of a digital output microphone sensor may be smaller than 50 ms, preferably smaller than 20 ms, or even 10 ms, to avoid noticeable delay artifacts in real-time audio applications running on the microprocessor core such as telephony. Other types of sensor devices may tolerate significantly longer read intervals without introducing noticeable or annoying delay artifacts to the intended functionality.

The sensor polling unit 120 additionally comprises an interrupt handler, IRQ, which is coupled to one or more of the externally accessible interrupt terminals (refer to FIG. 1) of the microprocessor 100. The interrupt handler transmits interrupt signals to the appropriate configuration logic block. Each of the configuration logic blocks are configurable to operate either according to a timer mode or an interrupt mode as explained below in additional detail in connection with the description of a trigger generator of the configuration logic block. Each of the configuration logic blocks transmits a read command or signal 217 when trigged by the previously mentioned trigger generator. The read commands are applied to a polling state machine 224 which is configured to issue a corresponding read command to the external sensor device through a selected one of the previously discussed I²C and SPI data communication interfaces connected to respective ones of the three external sensor devices. The read command generated by each of the configuration logic blocks preferably includes a device address of the designated external sensor device and one or more register addresses of the sensor data register(s) to be read in the designated external sensor device. The polling state machine 224 may comprise a semi-passive state machine build by an appropriate combination of combinatorial and sequential digital logic. The polling state machine 224 is further configured to receive register data held in the addressed one or more sensor data registers and transmitted by the designated external sensor device in response to the issued read command. The polling state machine 224 is configured to extract and transmit the received register data from the addressed sensor device to a predetermined microprocessor accessible data memory area or address space such as a number of predetermined memory locations arranged in the data memory of the microprocessor. The received register data are preferably transmitted directly to the predetermined data memory locations via a data receive interface block 226.

The data receive interface block 226 functions as interface between the polling state machine 224 and the predetermined memory locations arranged in the data memory. Since the interface to the data memory may be rather complex for example involving transmission through the previously discussed DMA channels (109, 111 of FIG. 1) and the associated DMA controller, this task is preferably handled by a dedicated piece of digital logic hardware of the data receive interface 226 such that the polling state machine 224 is off-loaded. This is because ordinary DMA controllers primarily transfer data in bursts while the sensor data transmitted by the polling state machine 224 tend to be scattered in time. The received register data from the sensors are frequently scattered in time because the register data read-out of a particular sensor device may origin from several separate read-out operations through the data communication interface 220. The data receive interface 226 collects these time scattered register data from the polling state machine 224 and assembles the scattered register data from the data registers of the sensor devices in one or more internal memory storage area(s). The internal memory storage area may comprise a FIFO buffer per sensor device. The register data content is temporarily held in the internal memory storage area(s) of the data receive interface 226, or alternatively simply in the polling state machine 224, is organized in a structured manner by the reassembling process. Hence, the assembled register data content can therefore be presented to, or applied to, the one or more DMA channels 109, 111 of the associated DMA controller(s) as ordered sequential data in accordance with a data exchange protocol of the DMA controller. Thus, allowing the register data to be transmitted in bursts by the DMA controller to the predetermined memory area of the data memory of the microprocessor. The data receive interface 226 may be configured to comply with the data exchange protocol of the DMA controller or handling a direct interface to the data memory via a data memory bus (135 of FIG. 1) coupled to the DMA controller. Hence, in the present context the term 'directly' means the register data are transmitted by the SPU to the predetermined data memory locations without passing through the microprocessor core. This feature markedly reduces the computational burden on the microprocessor core and saves power consumption in the microprocessor core because these register data do not have to pass through the power consuming data registers and data busses of the microprocessor core. The addresses of the predetermined data memory locations designated for storage of the received sensor data for each of the external sensor devices are preferably held in the DMA controller (item 122 on FIG. 1) if the microprocessor comprises a DMA channel and controller like the present embodiment.

If the microprocessor lacks the DMA capability, the addresses of the predetermined data memory locations for storage of the received register data from each sensor device are preferably stored in the associated configuration logic block. These addresses are preferably indicated by a data pointer. The latter configuration or embodiment makes the appropriate address space for each of the external sensor devices available to the polling state machine 224. If the microprocessor lacks the DMA capability, the data receive interface 226 may advantageously be extended to include a DMA like functionality configured to automatically transfer received register data into the data memory locations designated for the sensor device in question. This removes a considerable computational burden from the microprocessor core as the core would otherwise have to for every polling event fetch the register data from sensor device manually.

The polling state machine 224 is preferably configured for interrupting the microprocessor core in response to receipt and storage of a predetermined amount of register data in the designated data memory area of the data memory. The microprocessor core can therefore begin to process the amount or collection of register data that may represent register data content of a single external sensor device or respective register data contents of a plurality of external sensor devices. Since the microprocessor is aware of the respective addresses of the memory locations assigned for storage of the register data of each of the external sensor devices, the microprocessor core may apply the appropriate software application or program routine to process the sensor data content of any specific sensor device. These applications or program routines may be highly diverse depending on the type of the sensor device. Some of the program routines may for example filter the sensor data by a frequency selective filter or by a non-linear filter to suppress noise. The program routines may for example interpolate or decimate oversampled sensor sample values to improve signal resolution of sensor signals etc. Other program routines may restructure or filter the register data content for graphical presentation on a user interface display coupled to the microprocessor. Register data content that includes digital audio signals may be subjected to various block-based signal processing operations to enhance the perceptual quality of incoming audio signals, such as one or multiple microphone signal(s), before reproduction through a loudspeaker.

A communication unit 220 of the SPU 120 functions as interface between the polling state machine 224 and the previously discussed $I^2C$ and SPI data communication interfaces. The communication unit 220 preferably comprises an Advanced Microcontroller Bus Architecture (AMBA) compliant bus structure. Since the interface to the standardized bi-directional data communication interface may be rather complex due to the complexity of the protocol of the selected type of data interface, this task is preferably handled by a dedicated piece of digital logic hardware of the communication unit 220. Thereby, the polling state machine 224 is relieved from handling complex protocol details of the bi-directional data communication interfaces. The AMBA compliant bus structure has the advantage that it supports multiple bus masters. This feature allows the SPU 120 to interface directly to the AMBA compliant bus structure together with the microprocessor core and/or the DMA controller. The microprocessor core and/or the DMA controller may exploit the AMBA compliant bus structure to connect to the SPI data interface and/or the $I^2C$ data interface. Thus, redesign efforts in connection with integrating the present SPU 120 in a given microprocessor design, or System on Chip (SOC) design, are minimized since SPU integration may be effected without any proprietary data connections to the data communications interface. In particular, the multiple bus master support provided by the AMBA compliant bus may circumvent potential problems for the microprocessor core in accessing external program and data memory through the SPI and/or $I^2C$ data interfaces during boot time of the microprocessor.

FIG. 3 shows a detailed schematic block diagram of one of the configuration logic blocks, Config. 1, of the sensor polling unit (SPU) 120. The configuration logic block is part of a sensor register model that ensures each of the plurality of external sensor devices is associated with a particular configuration logic block. The configuration logic block is aware of the sensor register addresses, architecture, desired polling mode and read/polling time intervals etc. of the associated external sensor device. Some types of sensor devices may comprise only a single sensor register while other types of sensors may comprise a plurality of sensor data registers holding respective register data. To support sensor types with multiple sensor registers at least one of the configuration logic blocks preferably comprises a plurality of register addresses of the plurality of predetermined sensor data registers of the associated external sensor device. The skilled person will appreciate that the register addresses of the plurality of predetermined sensor data registers may either be consecutive or non-consecutive such that the plurality of register addresses of the at least one configuration logic block in one embodiment are consecutive reflecting the consecutive arrangement of the plurality of predetermined sensor data registers of the associated external sensor device. In an alternative embodiment, the the plurality of register addresses of the at least one configuration logic block are non-consecutive reflecting a non-consecutive arrangement of the plurality of predetermined sensor data registers of the associated external sensor device.

A configuration logic block may in some embodiments comprise individual register size indicators for the one or more predetermined sensor data registers. This feature is particularly useful for correct read out of the register data of mixed size data registers of an external sensor device.

Configuration data specifying to the above-mentioned characteristics of the each of the external sensor devices (e.g. register addresses, register architecture, desired polling mode and read/polling time intervals) may be written by the microprocessor core to the relevant registers of each of the configuration logic blocks in connection with an initialization procedure executed by the microprocessor during system power-on or boot. Alternatively, the configuration data may be written by the microprocessor core in connection with an application initialization routine. Furthermore, the microprocessor core may be configured to dynamically change the configuration data in certain embodiments of the SPU 120 where multiple external sensor devices are sharing the same configuration logic block. This embodiment is particularly useful in systems where there the number of external sensor devices exceeds the number of available configuration logic blocks of the microprocessor.

The configuration logic block comprises a trigger generator 313 that issues a read trigger 317 in respect of one or more predetermined sensor data registers of the associated external sensor device. When the read trigger 317 is issued, the corresponding register address to be read is simultaneously supplied by an address signal or command from multiplexer 311 to the polling state machine. The trigger generator 313 comprises a two-input multiplexer 315 which selects the mode of operation of the trigger generator 313. A first input of the two-input multiplexer 315 is coupled to the previously discussed interrupt handler, IRQ, which is coupled to the externally accessible interrupt terminals (refer to FIG. 1) of the microprocessor 100. Hence, if the first input is selected by the select input, supplied though Polling Mode register 319 of the two-input multiplexer 315, the interrupt signal will function as the read trigger. Hence, the configuration block will operate according to an interrupt based polling mode of the associated external sensor device. A second input of the two-input multiplexer 315 is coupled to a read signal generated at an output of a digital comparator 314. The digital comparator 314 is configured to generate the read signal if or whenever a value of the counter output of the global timer 321 matches a pre-set read value held in a read-interval register 312. Hence, the output of the digital comparator will provide read triggers at substantially constant time intervals due to the fixed value of pre-set read value and repetitive nature of the binary modulo N counter of the global timer. The time intervals between consecutive emissions of the read signal (corresponding to a sampling frequency of the associated external sensor) can be controlled or adjusted by writing a desired pre-set read value to the read-interval register 312. Overall, the trigger generator 313 is operable in two different or distinct polling modes: a time based polling mode or interrupt based polling mode. As mentioned above, the configuration logic block Config. 3 associated with Sensor 3 is operated according to the interrupt based polling mode and register data of Sensor 3 are generally read at irregular time intervals in response to an interrupt request generated by the controller of Sensor 3. The controller of Sensor 3 may for example be configured to issue an interrupt request only when a certain signal related criteria or event is met. The criteria may comprise that a predetermined amount of sensor data has been collected or a certain sensor signal exceeded a predetermined signal threshold etc. The skilled person will appreciate that the interrupt driven polling mode capability of the present sensor polling unit is highly advantageous for low-power sensors and microprocessor systems. Power consumption of the sensor polling unit 120 can be markedly reduced for numerous types of sensor devices and applications by polling these for register data only at the request of the sensor device via the interrupt request. Hence, sensor devices that generate new sensor data at unpredictable or random times are only polled in response to the availability of new register data. This feature minimizes digital circuit activity in the sensor polling unit 120 and reduces data transmission/receipt activity on the data interfaces like the SPI and I$^2$C serial data ports together with their associated board wiring etc.

The configuration logic block comprises a register file 309 holding a plurality, N, of register addresses of the sensor data registers of the associated external sensor device, Sensor 3. The skilled person will understand that other embodiments of the configuration logic block may hold only a single register address for example because the associated external sensor device is equipped with a single sensor data register or because the application in question only requires the content of a single sensor data register out of many available. The register addresses held in the register file 309 may either be consecutive or non-consecutive reflecting a corresponding an arrangement of the plurality of sensor data registers of the associated external sensor device. The register addresses from register 0 to N are sequentially transmitted to the polling state machine through appropriate manipulation of the select input of the multiplexer 311 performed by the schematically depicted select logic blocks 302, 304.

A microprocessor system comprising the present microprocessor 100 may include multiple power modes, e.g. sleep mode, surveillance mode and a normal operation mode, controlled by a suitable power mode control application executed by the microprocessor. According to a preferred embodiment of this microprocessor system, the configuration data of one or more of the above-mentioned configuration logic blocks are dynamically controllable. The power mode control application comprises a set of executable program instructions configured to control a setting of one or more the configuration logic block(s) in accordance with the power mode of the microprocessor system. This embodiment may be utilized to provide numerous useful enhancements to the configuration logic blocks for example to interrupt polling of an external sensor device that is unused in a particular power mode. Alternatively, the read time interval, i.e. polling rate, of the external sensor device may prolonged instead of the interruption. Interrupting or extending the read time interval will reduce power consumption of the SPU which is highly useful in a sleep-mode of the microprocessor system. The control of the read time interval, or the interruption, of the sensor polling provided by a configuration logic block is preferably implemented configuring the power mode control application to write a suitable pre-set read value to the previously discussed read-interval register 312 of the trigger generator 313 such that the time period between consecutive read triggers is extended.

The invention claimed is:

1. A sensor polling unit for microprocessor integration, comprising:
a sensor register model comprising one or more configuration logic blocks, each of the one or more configuration logic blocks being associated with an associated external sensor device of a plurality of external sensor devices;
each configuration logic block being configured to issue a read command for one or more predetermined sensor data registers of the associated external sensor device in accordance with a read trigger supplied by a trigger generator of the configuration logic block,
a global timer based on a clock signal of the microprocessor to supply a global time value to the trigger generators; and
a polling state machine operatively coupled to the one or more configuration logic blocks for receipt of respective read commands therefrom, said polling state machine being configured to issue a corresponding read command to the external sensor device through a standardized bi-directional data communication interface connected to the associated external sensor device;
wherein the polling state machine is further configured to receive register data transmitted by the external sensor device in response to the corresponding read command and transmit the received register data to a microprocessor accessible data memory area for storage.

2. The sensor polling unit according to claim 1, wherein the trigger generator of one or more of the configuration logic blocks comprises a block timer, driven by the global time value, to generate the read triggers at substantially constant time intervals or at varying time intervals.

3. The sensor polling unit according to claim 1, wherein:
the trigger generator of one or more of the configuration logic blocks comprises an interrupt input operatively coupled to an interrupt terminal of the microprocessor for receipt of an interrupt signal of the associated external sensor device; and
the trigger generator of one or more of the configuration logic block is configured to generate the read trigger in response to the interrupt signal.

4. The sensor polling unit according to claim 3, wherein at least one trigger generator comprises a mode selector configured to selectively couple the interrupt signal or the block timer through the trigger generator as the read signal so as to select a time based or interrupt based polling mode of the associated external sensor device.

5. The sensor polling unit according to claim 2, wherein:
the block timer comprises a binary modulo N counter having a counter output coupled to a first input of a digital comparator and a read-interval register holding a pre-set read value coupled to a second input of the digital comparator; and
the digital comparator is configured to generate the read trigger when a value of the counter output matches the pre-set read value so as to provide read triggers at substantially constant time intervals.

6. The sensor polling unit according to claim 1, wherein at least one of the configuration logic blocks comprises a plurality of register addresses of a plurality of predetermined sensor data registers of the associated external sensor device.

7. The sensor polling unit according to claim 6, wherein the plurality of register addresses are consecutive reflecting a consecutive arrangement of the plurality of predetermined sensor data registers of the associated external sensor device.

8. The sensor polling unit according to claim 6, wherein the plurality of register addresses are non-consecutive reflecting a non-consecutive arrangement of the plurality of predetermined sensor data registers of the associated external sensor device.

9. The sensor polling unit according to claim 1, wherein at least one of the configuration logic blocks comprises individual register size indicators for the one or more predetermined sensor data registers of the associated external sensor device.

10. The sensor polling unit according to claim 7, wherein the polling state machine is configured for issuing a burst read command to the associated external sensor device to read respective register values of the plurality of consecutive sensor data registers during a single read operation.

11. The sensor polling unit according to claim 1, wherein the standardized bi-directional data communication interface connected to the external sensor device comprises a serial synchronous interface.

12. The sensor polling unit according to claim 1, wherein the polling state machine is configured for interrupting the microprocessor in response to receipt and storage of a predetermined amount of register data in the microprocessor accessible data memory area.

13. The sensor polling unit according to claim 1, comprising a Dynamic Memory Access (DMA) interface operatively coupled to the polling state machine for receipt of register data therefrom; and
the DMA interface being operatively coupled to a DMA controller of the microprocessor for transmission of the register data to the microprocessor accessible data memory area via the DMA controller.

14. The sensor polling unit according to claim 13, wherein the polling state machine comprises a register area for intermediate collection and storage of a predetermined amount of the register data before transmission through the DMA interface to the DMA controller.

15. An integrated semiconductor die comprising:
a microprocessor; and
a sensor polling unit comprising:
a sensor register model comprising one or more configuration logic blocks, each of the one or more configuration logic blocks being associated with an associated external sensor device of a plurality of external sensor devices;
each configuration logic block being configured to issue a read command for one or more predetermined sensor data registers of the associated external sensor device in accordance with a read trigger supplied by a trigger generator of the configuration logic block;
a global timer based on a clock signal of the microprocessor to supply a global time value to the trigger generators; and
a polling state machine operatively coupled to the one or more configuration logic blocks for receipt of respective read commands therefrom, said polling state machine being configured to issue a corresponding read command to the external sensor device through a serial data interface connected to the associated external sensor device;
wherein the polling state machine is further configured to receive register data transmitted by the external sensor device in response to the corresponding read command and transmit the received register data to a microprocessor accessible data memory area for storage.

16. A microprocessor system comprising an integrated semiconductor die wherein the microprocessor system comprises:
- a microprocessor; and
- a sensor polling unit comprising:
  - a sensor register model comprising one or more configuration logic blocks, each of the one or more configuration logic blocks being associated with an associated external sensor device of a plurality of external sensor devices operatively coupled to the integrated semiconductor die;
  - each configuration logic block being configured to issue a read command for one or more predetermined sensor data registers of the associated external sensor device in accordance with a read trigger supplied by a trigger generator of the configuration logic block;
  - a global timer based on a clock signal of the microprocessor to supply a global time value to the trigger generators; and
  - a polling state machine operatively coupled to the one or more configuration logic blocks for receipt of respective read commands therefrom, said polling state machine being configured to issue a corresponding read command to the external sensor device through a standardized data interface connected to the associated external sensor device;
  - wherein the polling state machine is further configured to receive register data transmitted by the external sensor device in response to the corresponding read command and transmit the received register data to a microprocessor accessible data memory area for storage.

17. The microprocessor system according to claim 16, wherein the plurality of external sensor devices comprises one or more of the following: gyroscopic sensor, accelerometer, position sensor, temperature sensor, audio sensor, and magnetic field sensor.

18. The microprocessor system according to claim 16, wherein the microprocessor is configured to execute a power mode control application configured to select between multiple power modes of the microprocessor system;
- the power mode control application comprises a set of executable program instructions configured to control a setting of at least one configuration logic block in accordance with the power mode of the microprocessor system.

19. The microprocessor system according to claim 18, wherein the power mode control application is configured to control a setting of the trigger generator to disable the read triggers or change a time period between consecutive read triggers.

20. A method for off-loading a microprocessor from polling external sensor devices to reduce use of computing resources by the microprocessor, the method comprising:
- supplying a read trigger by a trigger generator of a configuration logic block, wherein the configuration logic block is associated with an external sensor device and the trigger generator has a global time value supplied by a global timer based on a clock signal of the microprocessor;
- issuing, by the configuration logic block, a read command for one or more predetermined sensor data registers of the external sensor device in accordance with the read trigger;
- receiving, by a polling state machine operatively coupled to configuration logic block, the read command from the configuration logic block;
- issuing, by the polling state machine, a corresponding read command to the external sensor device through a data communication interface connected to the external sensor device;
- receiving, at the polling state machine, register data transmitted by the external sensor device in response to the corresponding read command; and
- transmitting, over an on-chip data memory bus, the received register data to a microprocessor accessible data memory area for storage.

21. The method of claim 20, wherein supplying the read trigger comprises:
- generating a plurality of read triggers at substantially constant time intervals or at varying time intervals using a block timer driven by the global time value.

22. The method of claim 20, wherein supplying the read trigger comprises:
- receiving an interrupt signal of the external sensor device over an interrupt input of the trigger generator of the configuration logic block, said interrupt input operatively coupled to an interrupt terminal of the microprocessor; and
- generating, by the trigger generator, the read trigger in response to the interrupt signal.

23. The method of claim 22, further comprises:
- selecting a time based or interrupt based polling mode of the external sensor device by selectively coupling the interrupt signal or the block timer through the trigger generator as the read signal.

24. The method of claim 21, wherein generating the plurality of read triggers comprises:
- comparing, using a digital comparator, a value of a counter output with a pre-set read value, wherein the counter output is an output of a binary modulo N counter in the block timer coupled to a first input of the digital comparator, and the pre-set read value is held in a read-interval register coupled to a second input of the digital comparator; and
- providing read triggers at substantially constant time intervals when the value of the counter output matches the pre-set read value.

25. The method of claim 20, further comprising:
- issuing a burst read command to the external sensor device to read respective register values of consecutive sensor data registers of the external sensor device during a single read operation.

26. The method of claim 20, further comprising:
- interrupting, by the polling state machine, the microprocessor in response to receipt and storage of a predetermined amount of register data in the microprocessor accessible data memory area.

27. The microprocessor system according to claim 16, wherein the microprocessor is configured to execute an initialization procedure configured to write registers of a configuration logic block to specify configuration data comprising one or more of the following: arrangement of sensor data register(s), size of sensor data register(s), architecture, polling mode, and read or polling time intervals.

28. The microprocessor system according to claim 16, wherein the microprocessor is configured to dynamically change configuration data of a configuration logic block where multiple external sensor devices are sharing the same configuration logic block or where the number of external sensor devices exceeds a number of available configuration logic blocks.

* * * * *